United States Patent [19]

Mulier

[11] 3,718,142
[45] Feb. 27, 1973

[54] ELECTRICALLY SHIELDED, GAS-PERMEABLE IMPLANTABLE ELECTRO-MEDICAL APPARATUS

[75] Inventor: Pieter M. J. Mulier, Minneapolis, Minn.

[73] Assignee: Medtronic, Inc., Minneapolis, Minn.

[22] Filed: April 23, 1971

[21] Appl. No.: 136,890

[52] U.S. Cl. ............................................. 128/419 P
[51] Int. Cl. ............................................. A61n 1/34
[58] Field of Search ...................... 128/419 C, 419 E, 419 P, 419 R, 128/421, 422

[56] References Cited

UNITED STATES PATENTS

| | | | |
|---|---|---|---|
| 3,253,595 | 3/1966 | Murphy, Jr. et al. | 128/419 P |
| 3,486,506 | 12/1969 | Auphan | 128/419 P |
| 3,433,228 | 3/1969 | Keller, Jr. | 128/419 P |

*Primary Examiner*—William E. Kamm
*Attorney*—Thomas G. Devine, Lew Schwartz and Donald R. Stone

[57] ABSTRACT

A thin film of metal, deposited on an implantable cardiac stimulator, acting as a shield to prevent interference with the electronic circuitry of the stimulator, the interference produced by any outside apparatus which might induce RF interference on electrodes from the stimulator to the heart, or through the living tissue to the stimulator body itself. Also, before implantation, because of a variety of very well-known reasons, a static charge that may have been built up on the stimulator is avoided because of the deposited shielding.

10 Claims, 2 Drawing Figures

PATENTED FEB 27 1973 3,718,142

INVENTOR.
Pieter M. J. Mulier
BY Lew Schwartz
Thomas S. Devine
ATTORNEY

ELECTRICALLY SHIELDED, GAS-PERMEABLE IMPLANTABLE ELECTRO-MEDICAL APPARATUS

BACKGROUND OF THE INVENTION

Simple handling of an implantable cardiac stimulator may build up a static charge on its surface. When the stimulator is of the demand type, such a static charge buildup may cause the stimulator to stop pulsing. Static charge may cause the input circuits to the demand stimulator to have a potential which turns the stimulator off as though the heart which is intended to be stimulated is indeed operating and not in need of a pulse from the stimulator. Such a symptom may well lead the surgeon who is going to implant the stimulator into believing that it is inoperative. A metal shield will prevent the static charge buildup and thus preclude this misleading indication. Further, the metallic shield on the stimulator acts to prevent extraneous interference coming through the body tissues from upsetting the electronics of the stimulator after it has been implanted. Also, the electrodes leading from the stimulator to the heart itself act as antennae and if they are AC coupled to the shield, any RF signal coming in on the electrodes will be shunted to the shield rather than upsetting the electronic circuitry of the stimulator.

In the past, very little has been done to intercept unwanted signals. Implantable cardiac stimulators have been placed in metallic cans, but these have been expensive and unwieldy as compared to a deposition of a thin film of metal directly on the epoxy case of the stimulator. The batteries of a stimulator give off hydrogen gas. An epoxy case permits the gas to escape directly into the body of the user, it being evident that the case must permit the leakage of gas but should not permit the leakage of any body fluids. When the stimulator is placed in a metallic can, because of the inability of the metallic can to permit passage of hydrogen gas, space must be provided between the epoxy case and the can to accept all of the hydrogen gas that will be given off from the batteries. This requires a given volume defined by the outer surface of the epoxy case and the inner surface of the metallic can. The total volume required is larger than when a thin metallic film is deposited directly on the epoxy case.

The thin film is quite thin, being the result of a process of sputtering or the like. Thus the film is thin enough to rupture when the hydrogen gas contacts it. The ruptures are so small however that no substantial amounts of body fluids will pass through them. Also, with the proper impurities present, the sputtering or other deposition process will result in a thin film with pinholes of such a size to permit passage of gas but not of substantial amounts of body fluids.

SUMMARY OF THE INVENTION

A thin film of metal is vacuum deposited directly onto the case of the implantable cardiac stimulator. The metal must be impervious to the action of living body fluids and therefore is generally of the noble metal type. It is also important that the metal be uniformly deposited so as to aid in resistance to leakage. The epoxy material which encapsulates the stimulator is somewhat permeable by body fluids. The addition of the thin film of metal aids in reducing such permeability.

The film may be deposited by the well-known means of sputtering, evaporation deposition or by the less-precise method of electroplating. The mobility of implantation is enhanced by a relatively thin film and therefore vacuum deposition is preferred to other methods of forming film over the encapsulating material.

The thin film of metal precludes a buildup of static charge prior to implantation. This prevents indicia of a faulty stimulator and thus saves time and costs. Of great importance also is the fact that the thin film acts as a shield, blocking signals passing through the living tissue from disrupting the electronic circuitry of the stimulator. Further, if the thin film is properly connected to the electrodes of the stimulator, any unwanted signals conducted by the electrodes are shunted to the shields, thus avoiding interference with the electronic circuitry of the stimulator.

It is therefore an object of this invention to forestall any misleading indications of failure of the stimulator by reason of static charge having been impressed on the stimulator prior to implantation.

It is another object of this invention to shield the implanted stimulator from any unwanted electronic signals.

More specifically, it is an object of this invention to shield the electronic circuitry of the stimulator from electronic signals induced on the electrodes.

It is still another object of this invention to prevent electronic signals passing through the living tissue from interfering with the electronic circuitry of the implanted stimulator.

Further objects and advantages will be ascertained from an understanding of the description of the illustrative embodiment of the invention that follows.

DETAILED DESCRIPTION OF THE DRAWINGS

Figure 1:
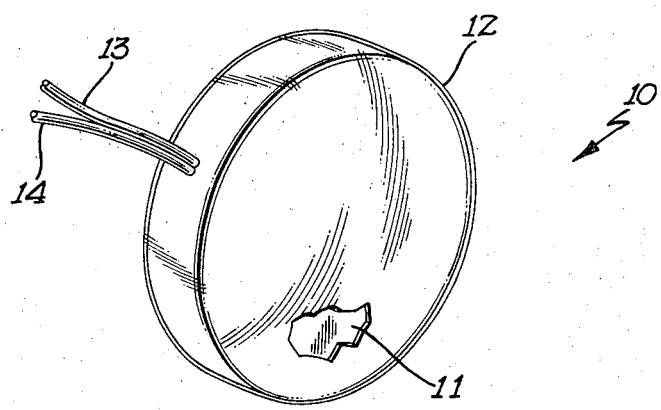
FIG. 1 shows an implantable cardiac stimulator with a thin film (exaggerated thickness) deposited on it.

FIG. 1 shows the electrically shielded implantable cardiac stimulator 10 with a thin metallic shield 12 deposited on an enclosure 11. Electrodes 13 and 14 come from the stimulator 10 and are implanted in appropriate parts of the heart.

Figure 2:
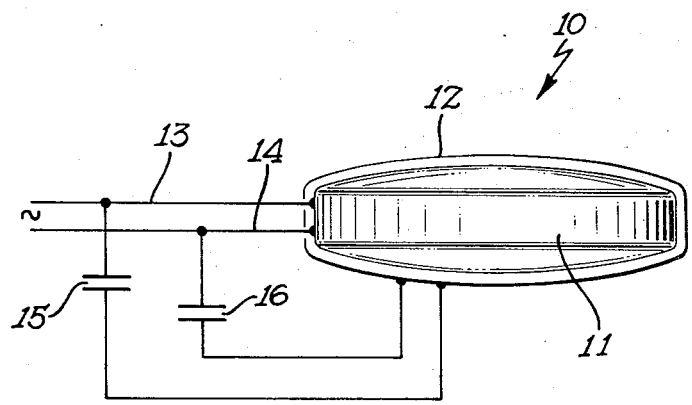
FIG. 2 is a schematic diagram showing the filter connection between the electrodes and the thin film.

FIG. 2 is a schematic diagram showing the enclosure 11 surrounded by thin film 12. Electrode 13 is shown coupled to thin film 12 by capacitor 15. Electrode 14 is shown coupled to thin film 12 by capacitor 16. Electrodes 13 and 14 are shown entering the stimulator 11, but not contacting shield 12.

MODE OF OPERATION

When subjected to stimuli for producing static charge prior to implantation, the electrically shielded cardiac stimulator 10 of FIG. 1 dissipates any such charge by reason of thin film 12 being a good conductor. Of course, the stimulator does not actually malfunction because of a static charge on its case and if it were implanted, the charge would dissipate through the body fluids and the stimulator would be completely operative.

After implantation, thin film 12 acts as an excellent shield to prevent any extraneous AC signal from interfering with the electronic circuitry of stimulator 10. With reference to FIG. 2, even if connection had not been made from electrode 13 by capacitor 15 and/or electrode 14 by capacitor 16, effective shielding would have been afforded by thin film 12.

However, signals induced on electrodes 13 and 14, as differentiated from all other extraneous signals, could produce some interference with the electronic circuitry of stimulator 10. Such induced signals would be diminished by the mere presence of thin film 12 and its nearness to the signals induced on conductors 13 and/or 14. However, the proper selection of capacitance of capacitors 14 and 15 result in a direct AC connection from electrodes 13 and 14 respectively to the thin film 12. This amounts to a shunting filter, diverting the induced signals on 13 and/or 14 directly to thin film 12. In this way, the electronic circuitry internal of stimulator 10 is not disturbed.

Those skilled in the art are aware of other ways of forming the thin film over the enclosure of the stimulator. Further, it is readily observed that the thin film is susceptible of being covered by an insulator such as a silicone rubber. These are obvious modifications, among others, which are contemplated by this invention.

What is claimed is:

1. In an implantable stimulator of the type having electronic circuitry and gas generating battery means all encased in a material having a substantially higher permeability to battery gas than body fluids, and at least one electrode, the improvement which comprises:
   film means covering said encasing material for allowing the escape of battery gases from said encasing material while preventing the passage of substantial amounts of body fluids therethrough, said film means comprising a thin film of metal capable of shielding the electronic circuitry from extraneous interference signals, said battery gas escape being accomplished through a rupture in the film means.

2. The implantable stimulator of claim 1 further comprising an electronic filter means connected between each electrode and the film means for shunting interference signals impressed on the electrode to the film means.

3. The implantable stimulator of claim 2 wherein the filter means comprises a capacitor providing a direct AC connection between the electrodes and the film means.

4. The stimulator of claim 3 wherein the thin film of metal is deposited by sputtering.

5. The stimulator of claim 3 wherein the thin film is deposited by evaporation deposition.

6. In an implantable stimulator of the type having electronic circuitry and gas generating battery means all encased in a material having a substantially higher permeability to battery gas than body fluids, and at least one electrode, the improvement which comprises:
   film means covering said encasing material for allowing the escape of battery gases from said encasing material while preventing the passage of substantial amounts of body fluids therethrough, said film means comprising a thin film of metal capable of shielding the electronic circuitry from extraneous interference signals, said film means having a plurality of pinholes therein and said battery gas escape being accomplished through the pinholes.

7. The implantable stimulator of claim 6 further comprising an electronic filter means connected between each electrode and the film means for shunting interference signals impressed on the electrode from the film means.

8. The implantable stimulator of claim 7 wherein the filter means comprises a capacitor providing a direct AC connection between the electrodes and the film means.

9. The stimulator of claim 8, wherein the thin film is deposited by sputtering.

10. The stimulator of claim 8, wherein the thin film is deposited by evaporation deposition.

* * * * *